United States Patent [19]

Gordon

[11] Patent Number: 4,774,007
[45] Date of Patent: Sep. 27, 1988

[54] PROCESS AND APPARATUS FOR ELIMINATING OIL FIELD WASTE PITS

[75] Inventor: Parris A. Gordon, Dallas, Tex.

[73] Assignee: Pollution Control Corporation, New Orleans, La.

[21] Appl. No.: 18,525

[22] Filed: Feb. 25, 1987

[51] Int. Cl.⁴ .................. B01D 17/028; B01D 17/032; B01D 17/05; B01D 17/09

[52] U.S. Cl. .................................... 210/766; 210/774; 210/805; 210/182; 210/187; 210/202; 210/207; 210/241; 210/513; 208/188

[58] Field of Search .............. 210/742, 744, 766, 774, 210/779, 801, 803–806, 176, 182, 187, 200, 202, 205, 207, 209, 241, 513, 522, 532.1; 208/181, 187, 188

[56] References Cited

U.S. PATENT DOCUMENTS

| | | | |
|---|---|---|---|
| 2,927,950 | 3/1960 | Mertes et al. | 208/188 |
| 3,296,117 | 1/1967 | Ross et al. | 208/188 |
| 3,920,552 | 11/1975 | Elkern | 210/205 |
| 4,153,553 | 5/1979 | Davis | 210/187 |
| 4,396,504 | 8/1983 | Tannehill | 210/522 |
| 4,515,684 | 5/1985 | Brown | 208/188 |
| 4,582,593 | 4/1986 | Bialek | 208/188 |

FOREIGN PATENT DOCUMENTS 274692 4/1967 Australia .......................... 210/241

Primary Examiner—Richard V. Fisher
Assistant Examiner—Richard D. Jordan
Attorney, Agent, or Firm—Keaty & Keaty

[57] ABSTRACT

The apparatus provides for a housing mountable on a trailer for conducting the process in-situ. A pump withdraws substantially all hydrocarbon-contaminated matter from the oil waste pit and delivers it into a lower chamber formed in the housing, wherein the hydrocarbon-contaminated matter is separated from the heavy solid particles and heavy salt water. The hydrocarbon-containing mixture, after being separated in the lower housing is delivered into the upper chamber formed in the housing and heated to facilitate separation, by gravity, of hydrocarbons, water and fine particles into various layers for subsequent withdrawal from the housing. The process of withdrawal of the hydrocarbon-contaminated mixture continues until hydrocarbon content of the oil waste pit is reduced to such degree that the waste pit becomes substantially hydrocarbon-free and is environmentally safe.

14 Claims, 4 Drawing Sheets

PROCESS AND APPARATUS FOR ELIMINATING OIL FIELD WASTE PITS

BACKGROUND OF THE INVENTION

This invention relates to a process and apparatus for cleaning and eliminating of oil field mud and waste pits, while recovering useful hydrocarbons and water.

During oil well drilling and production operations, a substantial quantity of contaminated water and other drilling and production fluids is dumped into unlined earthen pits and remains there for an indefinite period of time.

The use of such unlined pits was a preferable method of disposal for more than 1,400 oil fields found in the state of Louisiana alone since 1901.

This situation causes contamination of not only soil in the areas surrounding the oil well pits but also of underground water tables, since the contaminated water penetrates through the walls of the oil well pit creating environmental and ecological hazards.

A number of new regulations provide for the operation of waste pits. Some of them require that the pits be lined with plastic or clay to prevent leakage to contaminated fluids into adjacent areas. Other require that oil well pits be completely eliminated.

Various methods have been employed to fulfill these tasks. Some methods require that the contents of the waste pits are hauled off site and burned or recycled. Others require that the liquid be injected into the ground. The solids are then mixed with the soil or with fly ash. Other methods include burning the waste or moving it to lined areas with subsurface drainage. The levee around the pit is pushed in and the area is smoothed.

Since regulations about elimination of open oil waste pits become more rigorous every year, there clearly exists a need for a reliable system which would eliminate contents of the oil waste pit on site, thus substantially reducing the cost of disposal of oil field waste, including drilling mud and the salt water produced by the well. The cost of elimination of the oil waste pits can be further reduced if the contents of the waste pits are separated into liquids and solids and the liquids are treated to recover useful hydrocarbons and water.

SUMMARY OF THE INVENTION

The present invention provides a process and apparatus for cleaning and eliminating of oil well waste pits, while recovering useful hydrocarbons and water.

The process involves the steps of withdrawing the contents of the oil waste pit and separating heavier solids and heavy salt water from lighter solids, hydrocarbons, light salts and water; emulsifying the separated hydrocarbons, water, light salts and lighter solids, while increasing salinity of the water. The emulsified mixture is further moved through a number of baffles so that more solids are allowed to settle and separate themselves from the emulsified mixture. The mixture which has passed through the baffles is treated with a demulsification agent, contracting it and further causing settlement of still more solids. The remaining demulsified mixture of hydrocarbons, water, light salts and fine solid particles is heated to approximately 180°-200° F., after which it is allowed to cool to an approximately ambient temperature. As a result, the mixture is separated into a plurality of layers, by gravity, and each layer is individually recovered for further processing at desalination units, oil refineries or paraffin treatment plants.

If the contents of the oil waste pit prove to be extremely viscous, the process provides for a part of the initially drawn portion of the contents of the oil pit to be heated and, in the heated state, returned to the oil waste pit, mixing with the contents of the oil waste pit and bringing them to a less viscous state to allow for easy withdrawal of the less viscous fluid from the oil waste pit and handling of it by conventional pumps.

The same liquid return process is utilized to repeatedly supply part of water recovered from the treatment of the contents of the waste pit back into the oil waste pit to wash out any hydrocarbon contaminants left in the pit, which have penetrated into the walls or through the bottom of the oil waste pit. The above-described process is repeated for a number of cycles, until the oil waste pit is rendered substantially contaminant free, bringing the hydrocarbon content of the oil waste pit to less than 1%.

An apparatus which enables the above-described process to be performed comprises a housing divided into an upper and lower chambers. The lower chamber is, in turn, divided into a separation chamber, washing chamber and chemical chamber. The liquid which has been drawn from the oil waste pit is first delivered into the separation chamber, wherein it is separated into heavier solids, salts and lighter solids, plus hydrocarbons, light salts and water. A pump supplies emulsifying agent to the separated hydrocarbon mixture, emulsifying it and the same pump is also used to deliver salt to make the water heavier and to effect its substantial separation from the emulsified mixture.

A pair of separator plates, mounted at an obtuse angle to each other within the separation chamber assist in keeping the emulsified mixture above the level of heavier water. A plurality of baffles are mounted between the washing chamber and the chemical chamber so that a continuous supply of contaminated fluid into the separation chamber forces the emulsified mixture to move through the baffles into the chemical chamber. The chemical chamber is provided with a separate chemical pump to supply a demulsification agent for dispersing it in the mixture delivered into the chemical chamber, and a mist sprayer is provided for these purposes in the chemical chamber. The demulsified mixture is further drawn upward by a pump and delivered into the upper chamber, wherein a number of pairs of heating elements are positioned to evenly heat the contents of the upper chamber to the desired degree. Associated with each pair of heating elements is a heating sensor and a level indicator.

A number of fans and ventilation ports are provided to allow cooling of the mixture, after it has reached the predetermined temperature.

The apparatus also provides for outlet means for withdrawing contents of each separated layer and delivering them into various containers as necessary.

The apparatus also provides for a number of dump means to allow withdrawal of settled solid particles from the lower chamber. The housing can be mounted on a platform and delivered by a conventional truck or trailer to an on-site location, thus further reducing the cost of elimination of the oil well waste pit.

It is therefore an object of the present invention to provide a process and apparatus for cleaning oil well pits on site up to a complete elimination of the waste pit.

It is a further object of the present invention to provide a process and apparatus for recovering useful hydrocarbons and water from the contents of the oil waste pits.

DETAILED DESCRIPTION OF THE PREFERRED EMBODIMENT

Figure 1:
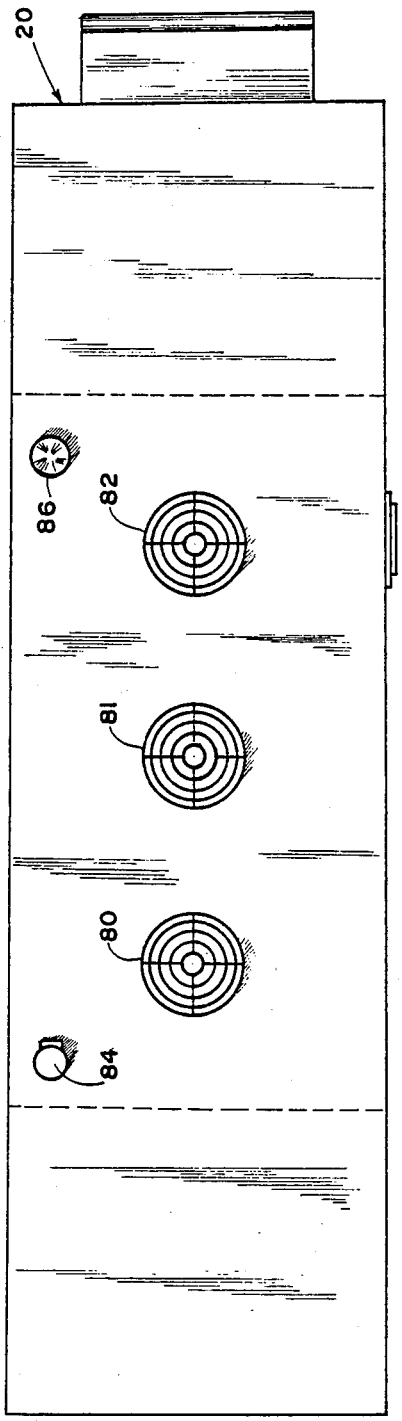
FIG. 1 is a top view of the apparatus of the present invention.

Referring now to the drawings, wherein like numerals designate like parts, the system of the present invention is designated in FIGS. 1-6 by numeral 10.

Figure 3:
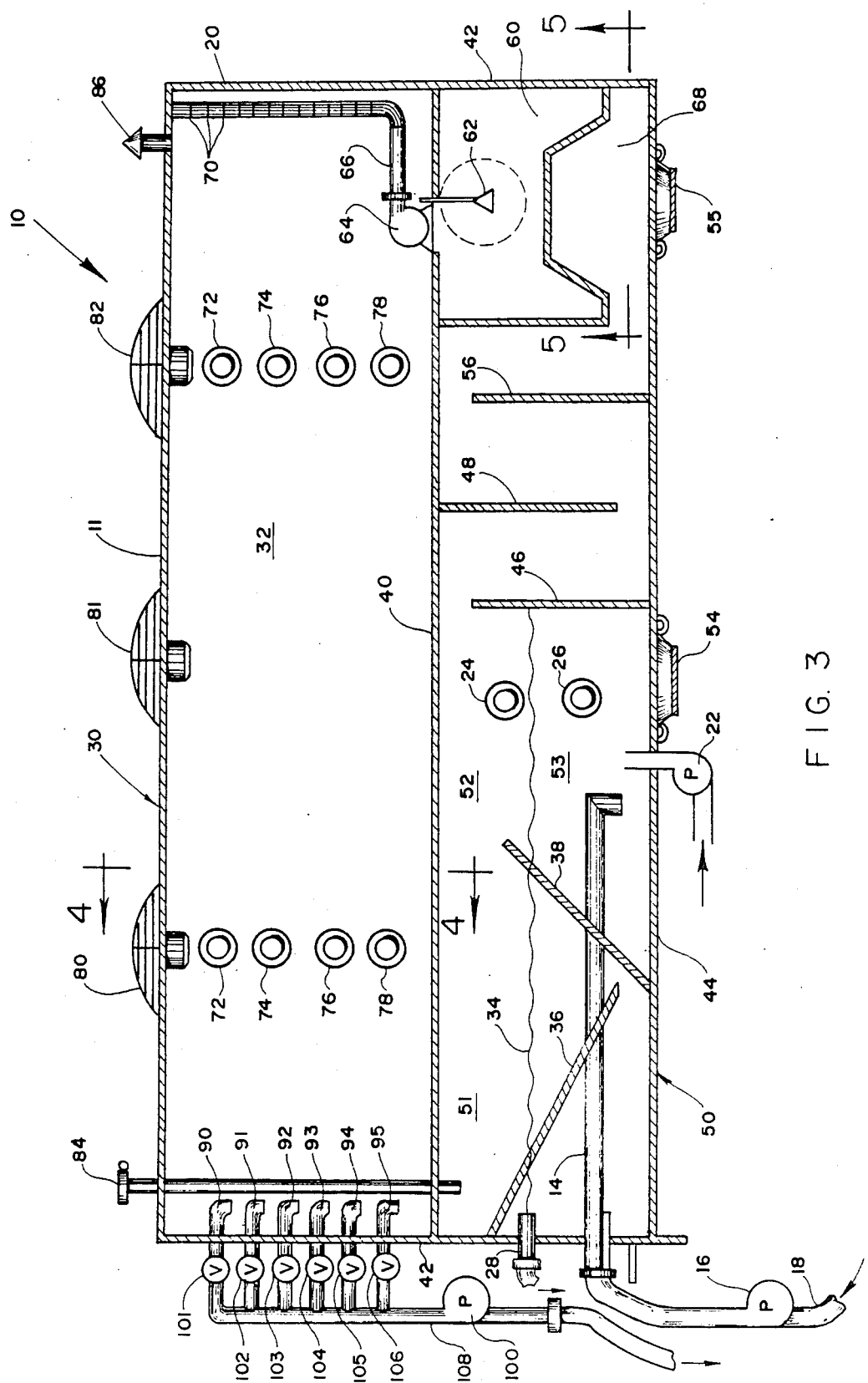
FIG. 3 is a cross-sectional view thereof.
Figure 4:
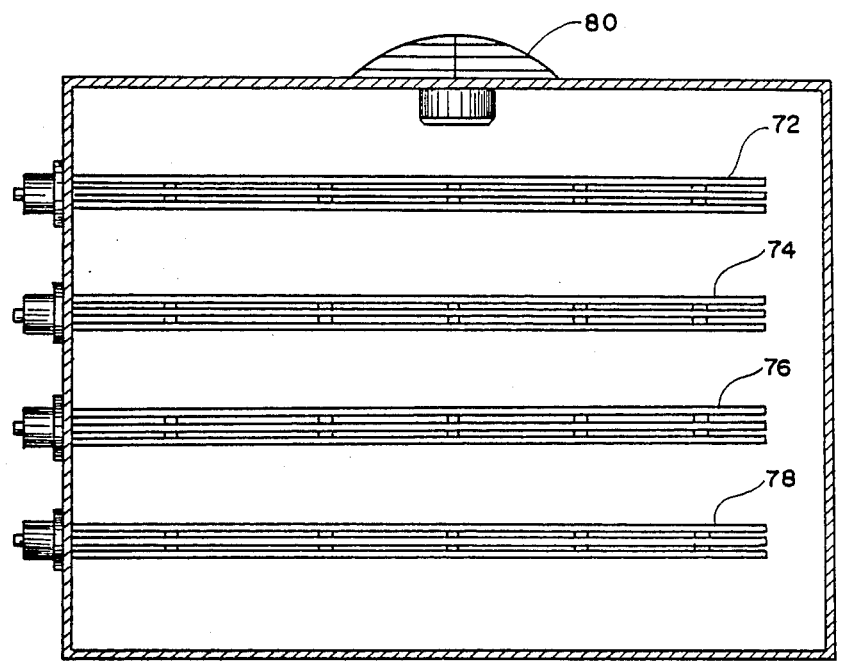
FIG. 4 is a side view of upper portion of the apparatus of the present invention, showing in better details the electrical heating elements.
Figure 5:
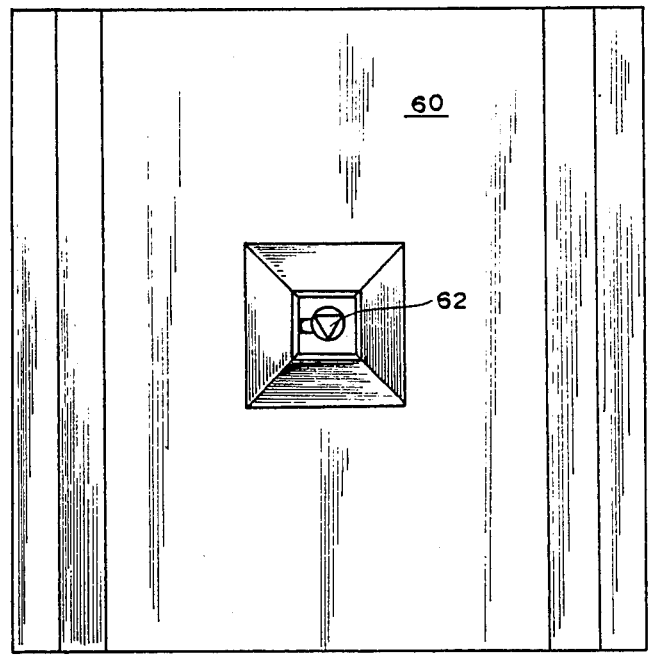
FIG. 5 is a bottom view of the chemical chamber with the chemical dispersement means mounted with the chamber.
Figure 6:
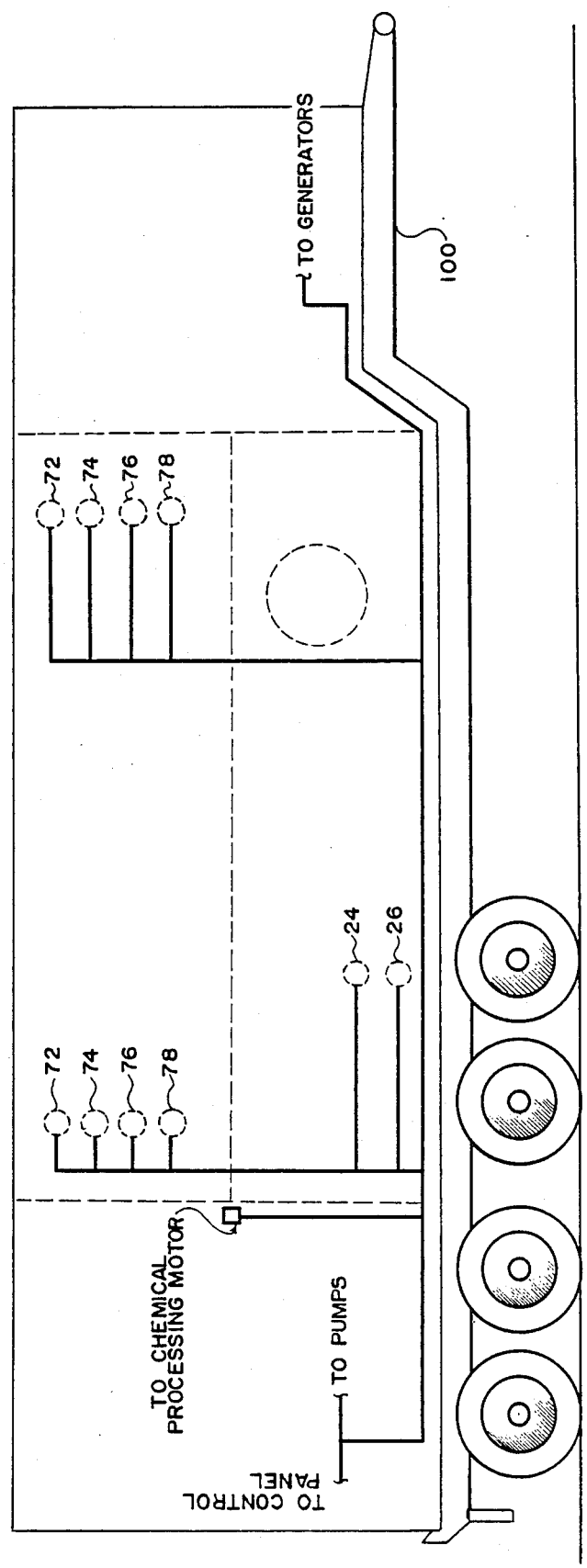
FIG. 6 is an electrical schematic view utilized in the apparatus of the present invention.

As shown in FIG. 3, the system 10 comprises a housing 20 having a substantially rectangular shape. The housing 20 is generally divided into two portions: an upper portion 30 and a lower portion 50. A dividing plate 40 extends through the length of the housing 20 separating it horizontally into the upper 30 and lower 50 portions.

Chambers 32 and 52 are formed thereby within the upper 30 and lower 50 portions, respectively with the aid of the separating plate 40. The lower chamber 52 comprises a separation chamber 51, washing chamber 53 and chemical chamber 60.

Mounted within the chamber 52 is an inlet conduit 14 through which, with the help of pump 16, the contents of the waste pit are delivered into the chamber 52.

The process of elimination of the waste oil pit begins with pumping of a small quantity of liquid, which will be generally brine, from the waste pit into the chamber 52.

In some cases, the waste pit is covered with crust which prevents direct pumping of liquid from the waste pit into the housing 20. In such case, a part of the crust is crushed and a hose, such as hose 18, is inserted through the opening made in the crust, so that the hose reaches the level of the salt water. It is important to note that in many cases, the contents of the waste pit are so viscous that normal pumping of the waste pit contents with the use of conventional pumps is not possible. Under such circumstances, electrical heating elements 24 and 26 which are mounted transversely in chamber 52 are energized, and the water which was initially delivered through the conduit 14 into the chamber 52 is heated to a necessary degree to effect viscosity of the contents of the oil pit and bring them into a less viscous condition.

A return line 28 communicates with the chamber 52 and the waste oil pit so that when the level of water initially pumped into the chamber 52 reaches the level of the return line 28, the heated water will flow from the chamber 52 back into the oil pit. The circulation of water from the oil pit into the chamber 52 and back into the waste pit continues until the viscosity of materials in the waste pit is sufficiently reduced to allow normal pumping of the materials through line 18, pump 16 and conduit 14 into the chamber 52.

In this manner, substantially all liquid material can be pumped from the oil pit with the exception of the largest solid particles which are screened with the help of a screen (not shown) mounted at an intake end within the conduit 18.

It is important for the process of the present application that the saline content of water be monitored, and pump 22 is provided for delivering a salt, such as for example, sodium chloride, into chamber 52 to increase salinity of the water.

Once delivered into chamber 52, the water and the contaminants separate from each other by gravity and the lighter contaminants raise above the water level 34, which is on approximately the same horizontal level as return line 28, into the top portion of separation chamber 51. At the same time, a substantial amount of water, being made heavier by the addition of salt, tends to remain in the bottom portion of chamber 51. A pair of separator plates 36 and 38 facilitate separation of the two layers within the chamber 51. As shown in FIG. 3, the separator plates 36 and 38 are positioned at an obtuse angle to each other, with the plate 36 being fixedly attached to the side wall 42 of the apparatus 20. The separator plate 36 is inclined downwardly and is approximately of the same width as the width of the apparatus 20. The separator plate 38, having the same width as separator plate 36, extends upwardly from the bottom 44 of the apparatus 20 at an angle to the bottom 44. Even though the separator plates 36 and 38 do not contact each other, the space between the lowermost portion of the plate 36 and plate 38 is such that only negligible quantity of contaminants may reach the bottom portion of the chamber 52.

In order to further facilitate separation of the heavy salt water, heavy solids and other contaminants, an emulsifier can be delivered, via pump 22 into the chamber 52, so that smaller particles of solids, light salts, some water and hydrocarbons float to the top of chamber 52 expanding under the influence of the emulsifier.

The intake process as described above continues and the emulsified contaminants move further from the intake pipe 14, through the washing chamber 53, over a first baffle plate 46, then flowing downwardly, under the pressure of the incoming material below a second baffle plate 48 and further upwardly over a third baffle plate 56. It should be noted that some solids settle in the chamber 53 prior to reaching the first baffle plate 46. These solids can be subsequently removed from the apparatus with the help of a dump means 54, which can be opened by a trap door, for example.

The emulsified mixture continues to move through the chamber 52, downwardly after it has passed baffle plate 56 into the chemical chamber 60. The chemical chamber 60 is provided with a chemical dispersement means, such as, for example, a mist sprayer in the form of a "swivel head", schematically shown in FIG. 3 and designated by numeral 62. A more detailed view of the chemical pump and chamber can be seen in FIG. 5.

The chemicals are delivered via pump 64. They contain a demulsification agent, which tends to contract the emulsified mixture, "breaking" the emulsion, so that the solids which have been travelling with the emulsified mixture through the chamber 52 settle to the bottommost portion 68 of the chemical chamber 60 and the hydrocarbons, light salts dissolved in water along with the relatively small particles of solids are forced to move upwardly into conduit 66 which is in fluid communication with both chemical chamber 60 and upper chamber 32.

The solids which settled near bottom portion 68 of the chamber 60 can be subsequently removed through another dump means 55, which are similar to the dump means 54 and can be also opened by a trap door.

A plurality of slots 70 in the conduit 66 allow the demulsified contaminated mixture to flow into the chamber 32 and seek its own level within the chamber 32.

A plurality of pairs of electrical heating elements 72, 74, 76 and 78 are positioned at various vertical levels within the chamber 32. Each heating element, similar to the heating elements 24 and 26 in the chamber 52, is electrically energized and is, for example, a three-phase electrical heating element. The use of electrical heating elements is especially advantageous, since they do not create hazardous conditions which are associated with gas heating means used in a similar environment. Associated with each heating element 72-78 is a thermostat (not shown) which detects the temperature at each vertical level of the chamber, once the heating elements are energized. Also associated with the heating elements is a plurality of volume sensors which are positioned on the levels substantially equal to those of the heating elements 72-78. In this manner, the fluid flow entering the chamber 32 through the slots 70 first reaches the level of the heating elements 78. The volume sensor sends an electrical signal to the thermostat which controls operation of the heating elements 78, energizing them and containing the energized cycle until the temperature of approximately 180°-200° F. is reached at this level. The second level in the chamber 32, wherein heating elements 76 are positioned, is gradually filled with the fluid flow from the slots 70 and the volume sensor likewise sends a signal to the thermostat, which, in turn, energizes the heating elements 76. This process continues until the chamber 32 is filled with the fluid and all heating elements, including heating elements 72 are energized. Once the pre-set temperature is detected on all heating elements 72-78, and the mixture is substantially uniformly heated, the heating elements are de-energized and the contents of the heating chamber 32 are allowed to cool for approximately three hours or to an ambient temperature.

To facilitate cooling process, a plurality of turbo fans 80, 81 and 82 are positioned in the top wall 11 to provide communication with the interior of the chamber 32 and the outside of the housing 20. With the use of the fans, the pressure build-up of gases within the chamber 32 of the housing 20 is relieved to avoid a hazardous situation. A pair of vents 84 and 86 are positioned in communication with the interior of the chambers 52 and 32, respectively. Each vent 84 and 86 is provided with a filter so that gases which are released during the process can be cleaned and filtered before they reach the atmosphere.

Once the temperature reaches the ambient temperature within the chamber 32, which can be detected by conventional testing equipment introduced at each level of the chamber 32 or by taking samples at various levels, the valves 101 through 106 of the outlet conduits 90-95, respectively are opened, allowing a pump 100 to withdraw separated materials via conduit 108 and deliver them to various containers outside the housing 20.

This is due to the fact that the contents of chamber 32 during the cooling process described above separate, by gravity, so that the heaviest materials, such as sand, asphalt and the like, are settled at the very bottom and are removed from the chamber via outlet 95.

The next layer which is formed above the solid particulate material is salt water, which is withdrawn from the chamber 32 and can be recycled into the pit since it is now environmentally safe or treated by any known chemical process to desalinize the water.

The third layer which floats above the salt water is a hydrocarbon in the form of paraffin which has not solidified but remains in a viscous state. This paraffin is withdrawn and is stored in a container for subsequent treatment at paraffin treatment plants and the like.

The top layer which rises above paraffin is light oil which, upon removal from the housing 20, is delivered into a container and sent to a refinery plant for processing.

A part of water from the chamber 52 is repeatedly returned into the waste oil pit, mixing with the residual in the oil pit, breaking the soil particles and washing out hydrocarbon contaminants which are pumped into inlet line 14, thus cleaning not only the sides and bottom of the waste oil pit of its hydrocarbon contaminants but also washing out the contaminants from the soil deeper than the surface area, down to approximately 4 ft. under the surface, until the oil waste pit is substantially contaminant free.

The system of the present invention, as can be seen from the above description, allows not only complete elimination of the contaminants in the waste oil pit but also recovery of useful hydrocarbons and water which could be processed by conventional methods and used in the usual manner.

The tests showed that an average size waste oil pit requires approximately 12-15 cycles of the process, as described above, in order to withdraw all contaminants from the waste oil pit and render it environmentally safe. The waste oil pit can be subsequently lined by conventional means, such as plastic liner, or completely eliminated by covering it with soil, depending on the requirements set forth by the owner of the waste oil pit.

The system of the present invention allows a substantially complete elimination of the contaminants in the waste oil pit, bringing the content of contaminants to less than 1%. The advantages of such elimination are clearly seen if one is to consider that the industry has long suffered from the inability to completely eliminate the oil waste pit and the lowest hydrocarbon content level which the elimination by known methods has achieved is about 5-10%. The new regulations require the hydrocarbon content to be reduced to at least 1½%, while the present invention allows the hydrocarbon content to be brought to less than 1%.

Figure 2:
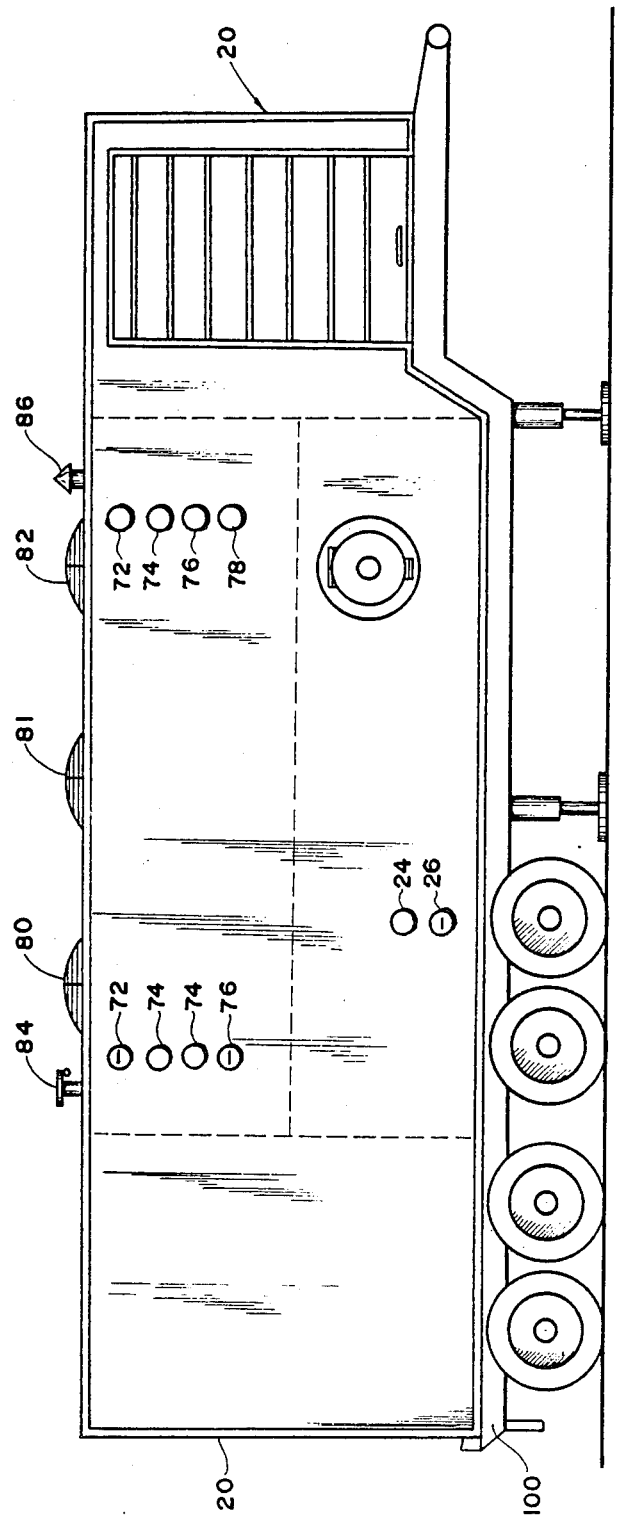
FIG. 2 is a side view of the apparatus of FIG. 1.

As shown in FIG. 2, the housing 20 can be mounted on a platform 100 and transported to a waste pit site, thus allowing the system of the present invention to be utilized for servicing a number of oil fields, thus substantially reducing costs of a waste pit elimination.

Additionally, there is no need for transporting environmentally dangerous wastes to an off-site location for disposal by other methods.

It should be understood that the description of the invention herein is set forth for exemplary purposes only and that various changes and/or modifications may be made hereto without departing from the scope of the appended claims.

I claim:

1. An apparatus for cleaning oil field waste pits, comprising:

a housing means divided by a separation wall into lower and upper chambers;

an inlet means adapted for withdrawing and delivering substantially all hydrocarbon-contaminated matter from the oil waste pit to the lower chamber;

means for separating heavy solid particles and heavy salt water from a hydrocarbon-containing mixture, said separating means comprising a plurality of separation and baffle plates mounted in the lower chamber;

means for delivering the separated hydrocarbon-containing mixture into the upper chamber;

a plurality of electrical heating means for selectively heating contents of the upper chamber at different vertical levels which contain means for independent activation of the heating means at different vertical levels; and outlet means for separate withdrawal of substantially separated hydrocarbons, water and fine particulate matter positioned at different vertical levels in fluid communication with the upper chamber and outside of the housing.

2. The apparatus of claim 1, wherein said lower chamber comprises a separation chamber, a washing chamber downstream from said separation chamber and a chemical chamber downstream of said washing chamber.

3. The apparatus of claim 2, wherein said separation chamber comprises a pair of separation plates mounted at an obtuse angle to each other, a first plate being attached to a side wall of the housing means and inclined downwardly, and a second plate being attached to a bottom of the housing and extending upwardly therefrom, said separation plates further facilitating separation of the heavy solid particles and heavy salt water from the hydrocarbon-containing mixture.

4. The apparatus of claim 3, wherein said separation chamber further comprises an inlet line and a return line mounted a distance above the inlet line, both lines fluidly communicating with the interior of the lower chamber and the oil waste pit.

5. The apparatus of claim 4, further comprising heating means for heating in the separation chamber a part of contaminated liquid which is delivered into the lower chamber and is allowed to flow outside the housing means through the return line into the oil waste pit.

6. The apparatus of claim 2, wherein said washing chamber comprises means for delivering a salinizing agent to facilitate separation of heavy salt water delivered into the lower chamber from the mixture.

7. The apparatus of claim 2, further comprising baffle means mounted between the washing chamber and the chemical chamber for forming a convoluted passageway to assist in separation of a heated emulsified hydrocarbon-containing mixture from heavy solid particles and heavy salt water delivered into the washing chamber.

8. The apparatus of claim 7, further comprising means for delivering contaminated mixture from the chemical chamber to the upper chamber.

9. The apparatus of claim 7, wherein said chemical chamber comprises means for introducing a demulsification agent to the emulsified mixture and means for withdrawing solid particles which settle, by gravity, in the chemical chamber.

10. The apparatus of claim 9, wherein said upper chamber further comprises ventilation means to assist in cooling the heated mixture and separating it into a plurality of layers within the upper chamber.

11. A process of cleaning oil waste pits, comprising the steps of:

withdrawing substantially all hydrocarbon-contaminated matter, which comprises solids, hydrocarbons, dissolved salts and water from the oil waste pit;

separating heavier solids and heavy salts from a hydrocarbon-containing mixture comprising water, hydrocarbons, dissolved light salts and lighter solid particles;

emulsifying a separated hydrocarbons-containing mixture;

adding a salinizing agent to effect salinity of water;

forcing the emulsified mixture through a baffle means to cause settlement of heavy solid particles and heavy salt water by gravity;

adding a demulsification agent to the separated layer containing the hydrocarbons and solid particles in sufficient quantity to cause further settlement of the solid particles;

withdrawing settled particles with reduced hydrocarbon content of less than 1%;

heating the mixture with the added demulsification agent; and cooling the mixture to a temperature sufficient to cause separation, by gravity, into a plurality of layers, thereby separating hydrocarbons from water and fine solid particles.

12. The process of claim 11, wherein the part of the contaminated matter withdrawn from the oil waste pit is heated, on demand, and returned to the oil waste pit to decrease viscosity of contents of the oil waste pit.

13. The process of claim 12, wherein the step of heating the demulsified mixture is performed in the range of 180°–200° F.

14. The process of claim 13, wherein a part of water separated from the contaminated mixture is repeatedly returned to the oil waste pit and mixed with contents thereof for subsequent withdrawal from the oil waste pit along with the contaminated mixture remaining in the waste pit until the oil waste pit is substantially contaminant free, with a hydrocarbon content being less than 1%.

* * * * *